(No Model.) 2 Sheets—Sheet 1.

G. H. SELLERS.
APPARATUS FOR PURIFYING WATER.

No. 564,939. Patented July 28, 1896.

WITNESSES:
Henry Drury
Edw. F. Ayres

INVENTOR:
George H. Sellers
by his atty.
Francis T. Chambers

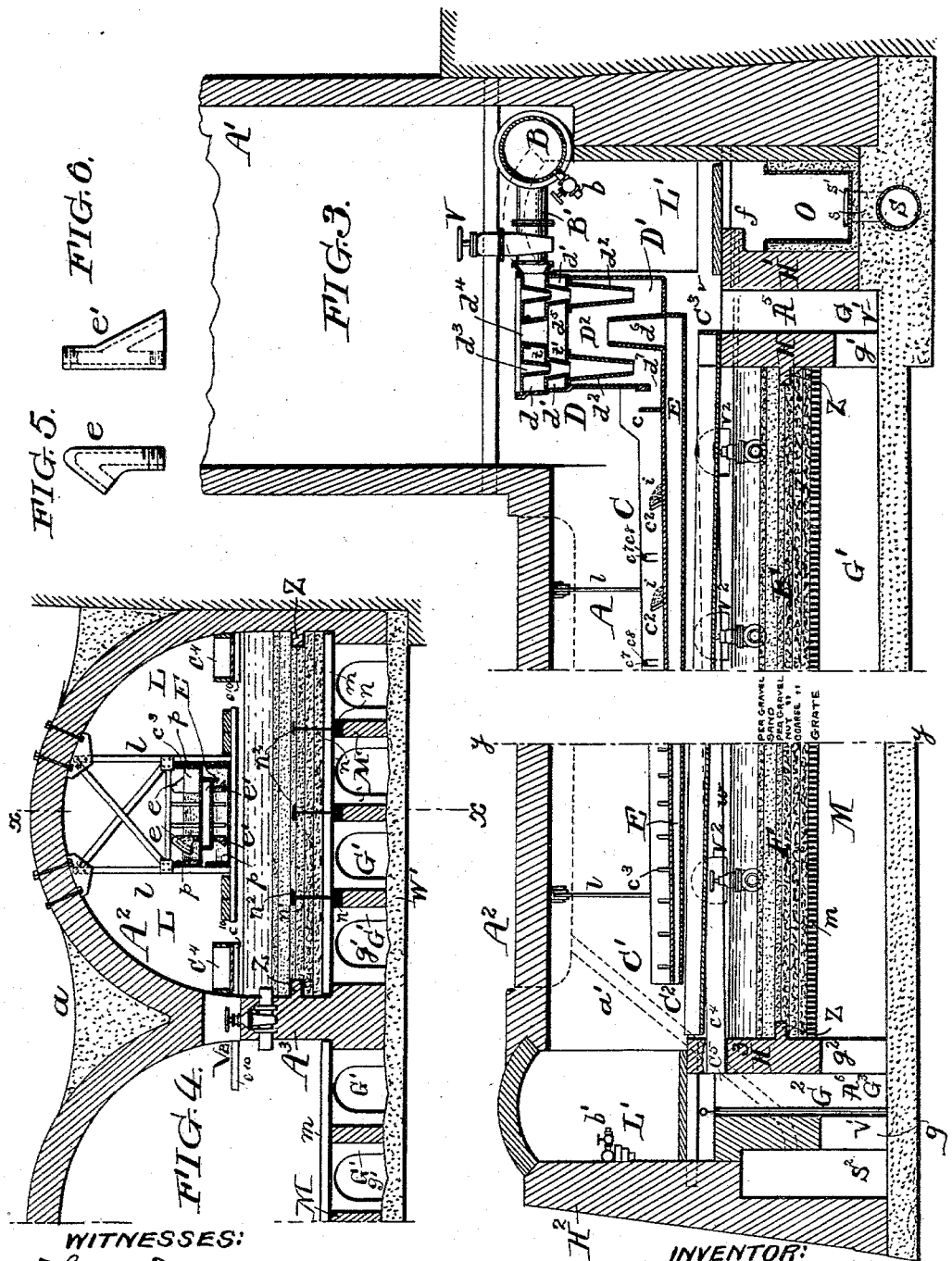

UNITED STATES PATENT OFFICE.

GEORGE H. SELLERS, OF WILMINGTON, DELAWARE, ASSIGNOR TO THE UNITED STATES FILTERING AND PURIFYING COMPANY, OF NEW JERSEY.

APPARATUS FOR PURIFYING WATER.

SPECIFICATION forming part of Letters Patent No. 564,939, dated July 28, 1896.

Application filed May 29, 1893. Serial No. 475,843. (No model.)

*To all whom it may concern:*

Be it known that I, GEORGE H. SELLERS, a citizen of the United States, residing at Wilmington, in the county of New Castle, in the State of Delaware, have invented a certain new and useful Improvement in Apparatus for Purifying Water, of which the following is a true and exact description, reference being had to the accompanying drawings, which form a part of the specification.

My invention relates to apparatus for purifying water, and is especially adapted to be used in connection with extensive works for cities or other places where a large and continuous supply of pure water is needed.

My apparatus, considered as a whole, is made up of two parts, which coact in the purification of the water. That part through which the water passes first consists of appliances for effecting the chemical purification of the water by an aerification and the action of iron oxid, while that portion through which the water passes after leaving the before-mentioned portion of the apparatus consists of a filter for effecting the mechanical separation of the impurities from the water, carrying them together with various appliances for making the connection of the filter effect the cleaning of the filtering-bed and generally manipulating the water in the filter.

In my present application I seek protection for the novel devices pertaining to the filter. The various novel features of the apparatus for effecting the chemical purification of the water preparatory to subjecting it to the action of the filter, being considered as a separate invention, will form the subject-matter of another application for Letters Patent.

My invention is best described in connection with the drawings, in which it is illustrated, and in which—

Figure 1:
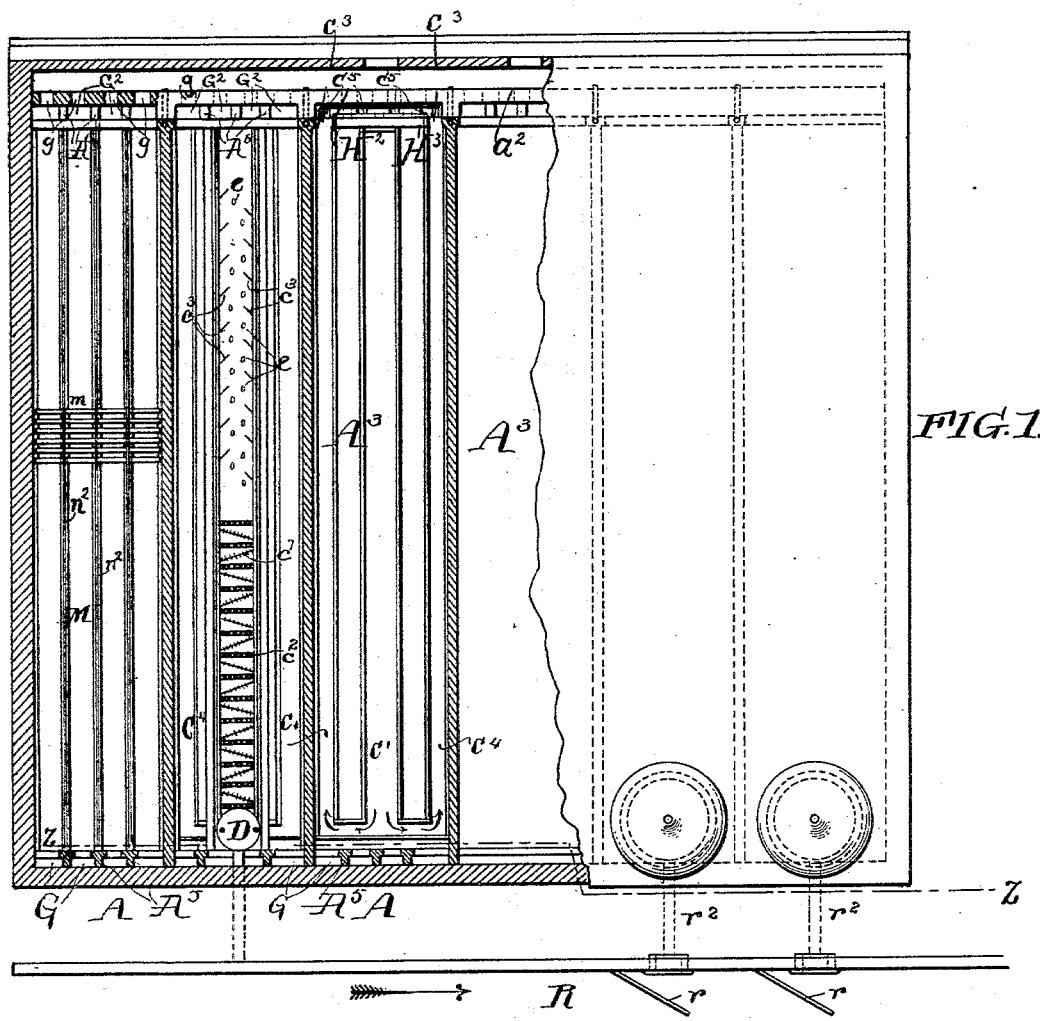
Figure 2:
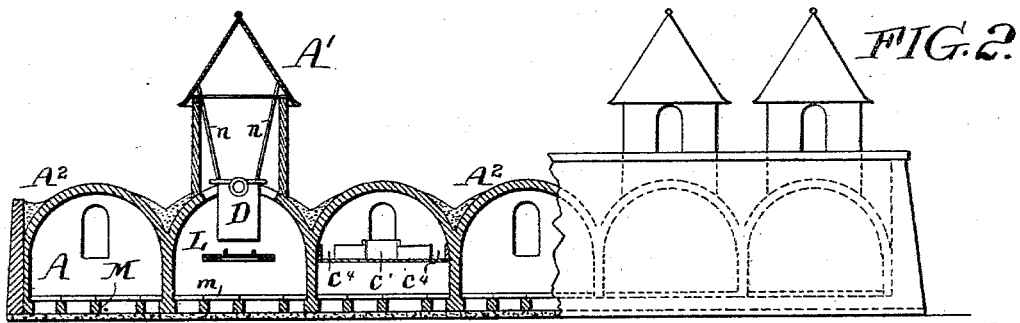

Figure 1 is a plan view, partly in section, of a water-purifying plant constructed according to my invention. Fig. 2 is a sectional view on the line $z\ z$ of Fig. 1. Fig. 3 is a longitudinal section on the line $x\ x$ of Fig. 4, showing one of the filtering-sections and the mode of introducing the water. Fig. 4 is a cross-section on the line $y\ y$ of Fig. 3, showing a section of the water-conduit and the air-passages. Figs. 5 and 6 are detail views of the air-passages leading to the upper and lower water-conduits.

A represents a complete filtering apparatus, which may be duplicated as often as may be necessary to complete the plant, as shown in Fig. 1.

$A^2$ are brick or stone arches built preferably below the surface of the water to be filtered, so that it may flow into the apparatus by gravity and accessible through the small tower or towers $A'$. The water to be purified may be taken into the apparatus through pipes, as $r^2$, from a race or stream, as R, and is conducted through a main, as B, and distributing inlet-pipes $B'$ to each filtering apparatus. The water on leaving an inlet-pipe $B'$ passes through conduits C $C^2$, where it flows through scrap-iron and is aerated, and then through conduits $C^4$ and passage $G^2$ down under a filter, as F, through the filter, where all impurities are removed, and finally out through the outlet-pipe $f$ to the clear-water main O.

The air to aerate the water may of course be taken from any convenient supply of compressed air, but I prefer to compress the air by the action of the water itself as it flows from the pipe $B'$ to the conduit C. Any convenient pump can be operated by the water to compress the air, but I prefer to use an injector-pump operated by the flow or fall of the water. A convenient form of such a pump is illustrated at D, which consists, as shown, of a cylindrical chest, preferably of cast-iron, divided into three compartments $d$, $d^5$, and $D'$ by partitions, as $t\ t'$. This pump D may be conveniently supported by straps, as $n\ n$. The water flows from the pipe B into the upper compartment $d$ and flows downward through nozzles $d'$ and $d^2$ into the chamber $D'$. Air is drawn in by the falling water through nozzles $d^3$ from the outer air and from the compartment $d^5$, which is open to the air at $d^4$, through the annular openings between the nozzles $d'$ and $d^2$. The air and water flow into the compartment $D'$, whence the water already considerably aerated by the air which it has drawn in through the nozzles $d^3$ $d^4$, &c., flows through the opening $d^7$ and over the baffle $c$, which serves to make a water-seal over the opening $d^7$ into the conduit C. The air, somewhat compressed, escapes by the nozzle $d^6$ into the air-reservoir E, which may be conveniently arranged between the conduits C and $C^2$, from whence it is conducted through nozzles, as shown at $e\,e'$, into the water flowing in the conduits C and $C^2$. These nozzles may of course be of any suitable form, the forms shown in Figs. 5 and 6 being, however, very convenient for this purpose. In the conduit C, I place racks or cradles $c^2$, preferably formed of a series of fingers, and place against them scrap-iron, preferably in the shape of punchings, as at $i$. Any desired number of these racks may be arranged, as shown in Fig. 1, and across the conduit between the racks bars, as $c^7$, may be laid, on which iron bars, or horseshoes, or other scrap-iron $c^8$ may be hung, so as to extend into the water-current. These bars are laid obliquely across the conduit, so that the water-current will agitate the iron bars or other scrap hung thereon and prevent their rusting together. The racks $c^2$ are also arranged so that an attendant can conveniently stir the punchings at intervals to prevent the punchings or other scrap-iron rusting together and so impeding the flow of the water. In the conduit C below the racks are placed riffle or crisscross bars $C^3$, preferably arranged so as to throw the stream of water from one side to the other of the conduit and to cause all the water to flow around the nozzles $e\,e'$ for aeration. The same construction may be duplicated in the conduit $C^2$. By causing the water to flow through iron scrap, the oxidation of the iron forms ferric hydroxid, as explained, and the small particles of rust carried away and held in suspension by the water attach themselves to and coagulate the carbonates or impurities in the water and so enlarge them that they are prevented from passing through the filtering apparatus, and this oxidizing or rusting of the iron is facilitated by the aeration of the water, which also serves to render the water fresh and palatable as it issues from the filter.

The water being aerated in the conduit C' flows into the second conduit $C^2$, where it is further aerated and a more complete gathering of the impurities takes place. The water flows from the conduit $C^2$ by the mouth $C^3$ into channels $C^4$, which are situated, as shown, on each side of the channel C'. The channels $C^4$ are not much inclined, so that the water will flow slowly and there will be sufficient time for the coagulation to be formed. The water finally empties from the conduit $C^4$ through outlets $C^5$ into the wells $G^2$. These wells $G^2$ are formed by the walls $H^2\,H^3$ on two sides and by walls $A^6$ or the partition-walls $A^3$ of the different sections on the other two sides. There are just as many of these wells as there are divisions of the filter, the partition-walls $A^3$ being continuations of these walls M on the other side of the wall $H^3$ from the walls M, and these partition-walls $A^3$ extend up higher than the level of the water in the filter F. The object of these partition-walls $A^3$ and M is to divide each filter into a number of divisions for convenience in cleaning, as will be explained. From the wells $G^2$ open passages $g^2$ to the space G' beneath the filter, the walls M, built on the concrete floor W, serving to support cross-slats, as $m$, which may be of wood, on which is laid a filtering-bed. This filtering-bed may be made of any convenient filtering material; but I prefer to use gravel in layers, which increase in fineness from the bottom to the top, as by forming the lower layer of coarse gravel and so on, as indicated in Fig. 3, till fine sand is reached a layer of coarser gravel may be laid on the sand to prevent its displacement under the ascending currents of water. After the water has risen through the filter and been cleaned of its impurities it flows through the conduit $f$ into the clear-water main O, a drain-pipe S being arranged below the main O for purposes of cleaning and being connected thereto by means of passages $s$ and gates $s'$.

For convenience in cleaning, wells similar to the wells $G^2$, formed by side walls $A^3$ and partition-walls $A^5$ similar to walls $A^6$ on two sides and the walls H H' on the other two sides, are arranged at the other end of the apparatus from said wells $G^2$ and open into the space G' by means of openings $g'$ similar to the arches $g^2$. When it is desired to clean the filter, the supply of impure water is shut off by closing the valve V, and the valves V' in the bottoms $G^3$ of the wells $G^2$ are opened. This permits the water in the apparatus to flow through passages $g$ to the waste-main $S^2$. The pure water at $w$ above the filter-bed also flows back through the filter by gravity and in so flowing carries the impurities lodged therein down and away to the waste-main $S^2$. If there should be insufficient water above the particular filter that it is desired to clean to properly carry away the collected impurities, a greater quantity of clean water may be obtained by opening valves $V^2$, communicating with other sections of the apparatus. Water may also be introduced into the wells and passages G $G^2$ G' by means of suitable hose connected with the water supply at $b\,b'$ and any slime washed away.

If it is desired to cleanse any one division of the filter, the particular valve V' which governs its outlet $g$ can be opened and water will not only flow from above back through said filter-bed, as described, but the incoming water from the other divisions of the filter will flow out through the open passage and aid in effectually cleaning out the opened division, and this water from the other divisions comes to the open division sidewise rather than vertically, as the water above the filter-bed comes, and so effectually washes away any impurities which would not be removed by the use of the water from above the filter-bed.

To compel the water in any division to become partially filtered before being used to clear another division, I prefer to arrange the filter-bed as shown in Fig. 4, where $n\,n$ are blocks of wood laid on the walls M, and $n'$ are upright board walls secured to the blocks $n$ and extending a short distance into the filter-bed, so that water from any one division will have to flow over these walls $n'$ to get to the next division. The conduits C $C^2$ may be conveniently supported by brackets, as $l$, hung from the top of the arches $A^2$, and planks may conveniently be arranged at L for footways for the workmen, and to support the conduit $C^4$ bars, as $c^{10}$, may be arranged in the walls $A^3$, projecting from each side in the manner shown.

L' L' are suitable doorways communicating from one filter-section to the next. The arches may be filled, as at $a$, with cement to prevent surface water from leaking into the space beneath, and a drain-pipe, as $a'$, leading to the waste-main $S^2$ may be provided to guard against any accumulation of water between the masonry arches.

A grid or deflector, as shown at $r$, may be used to prevent leaves or large impurities in the race from entering the filtering-chambers.

The conduits C are very conveniently made of cast-iron, and to prevent wear or rusting they are preferably covered on their inside to a short distance above the water-line with cement, as shown at $p$. The wells G $G^2$ may also be lined with cement, as may any other part of the apparatus when its use is desirable.

In practice it has been found that the water as it rises through the filter will carry away the sand and other filtering material which lies next to the walls of the filter, and thus make a passage for itself between the filter-walls and the filtering-bed through which it can pass unfiltered. To prevent this, I place an obstruction to the flow of the water all around the walls of the filter. This obstruction may be made of wood or any other proper material, but I prefer to make it by a projection from the brick walls themselves, as shown at Z, Figs. 3 and 4. This causes the water to pass inward into the body of the filter-bed and prevents any unfiltered water from escaping through the filter; and I also arrange a projecting piece $n^2$ on the top of the wall $n'$ for the same purpose.

In the drawings I have shown what I consider the best plan of my apparatus, but it is evident that numerous changes can be made in the arrangement of the parts without departing from the spirit of my invention, and I do not desire to be considered as limiting myself to the precise construction shown.

Having now described my invention, what I claim as new, and desire to secure by Letters Patent, is—

1. The combination with a filtering-chamber having an inlet for water to be filtered, of a plurality of division-chambers, as G' communicating with a waste-water conduit, each of said chambers having a water supply and an independent outlet to the waste-conduit, filter-beds corresponding with the division-chambers and communicating with one another, an outlet-conduit for filtered water, and means for controlling the flow of water into each chamber G' and the outlet of water from each chamber to the waste-conduit.

2. The combination with two or more chambers G', each having an independent water supply and an independent outlet to a waste-water conduit, of a filter-bed supported above said chambers, partitions as $n^2$ dividing the filter-bed into compartments corresponding to the underlying chambers G', an outlet-conduit for filtered water leading from the upper part of the filter, and means for controlling the flow of water to each chamber G' and the outlet of water from each such chamber to the waste-water conduit.

GEO. H. SELLERS.

Witnesses:
J. WALTER ZEBLEY,
EDW. F. AYRES.